United States Patent [19]

Miwa et al.

[11] 4,067,855

[45] Jan. 10, 1978

[54] FIBER AND FILM FORMING POLYESTER COMPOSITION

[75] Inventors: Tsuneyoshi Miwa, Otsu; Shinji Nakazawa, Shizuoka; Masaaki Itoga, Otsu; Keizo Sano, Shizuoka; Itaru Nakamura, Mishima; Taigi Watanabe, Mishima; Yasuhiko Shingu, Mishima, all of Japan

[73] Assignee: Toray Industries, Inc., Tokyo, Japan

[21] Appl. No.: 633,657

[22] Filed: Nov. 20, 1975

Related U.S. Application Data

[63] Continuation of Ser. No. 489,163, July 17, 1974, abandoned, which is a continuation-in-part of Ser. No. 309,993, Nov. 28, 1972, abandoned.

[51] Int. Cl.$^2$ .............................................. C08G 63/18
[52] U.S. Cl. ................................. 260/75 R; 260/75 P
[58] Field of Search .......................... 260/75 R, 75 P

[56] References Cited

U.S. PATENT DOCUMENTS

| | | |
|---|---|---|
| 2,921,051 | 1/1960 | Amborski et al. ................. 260/75 R |
| 3,048,564 | 8/1962 | Heffelfinger ....................... 260/75 R |
| 3,171,828 | 3/1965 | Isaacs et al. ........................ 260/75 P |
| 3,651,017 | 3/1972 | Tanabe et al. ..................... 260/75 R |
| 3,657,180 | 4/1972 | Cohn ................................... 260/75 R |

FOREIGN PATENT DOCUMENTS 1,141,453  12/1962  Germany.

OTHER PUBLICATIONS

Zimmermann et al., Abhandl. Deut. Akad. Wiss. Berlin, Kl. Chem., Geol. Biol. 1965(3), pp. 19–27.

Primary Examiner—Harold D. Anderson
Assistant Examiner—W. C. Danison, Jr.
Attorney, Agent, or Firm—Miller & Prestia

[57] ABSTRACT

Polyester compositions suitable for fiber and film formation contain from 0.2 to 3.0% by weight of fine particles of uniform size and possess sufficient slippery tendency, appropriate opacity and crystallizing potential; said particles containing lithium and phosphorus as a lithium salt of a phosphoric acid ester constituent of short chain polyesters.

5 Claims, No Drawings

FIBER AND FILM FORMING POLYESTER COMPOSITION

This is a continuation of copending U.S. application Ser. No. 489,163, filed July 17, 1974, now abandoned, which is a continuation in part application of co-pending U.S. application Ser. No. 309,993, filed Nov. 28, 1972, now abandoned, of common inventorship and assignment herewith. The present invention relates to polyester compositions suitable for fiber and film formation, which compositions possess sufficient slippery tendency, appropriate opacity and crystallization potential.

Saturated linear polyesters such as poly(ethylene terephthalate) are widely acceptable for both apparel and industrial purposes in the form of fibers, films, etc. This is undoubtedly due to the excellent mechanical properties, the fine heat stability, the low electric conductivity and the fine chemical stability of the polyesters.

In general, melt-extruded polyester fibers and films are characterized by a smooth surface which gives high running friction, high static friction and high surface luster. When such polyesters are melt-extruded, taken-off, stretched or heat-treated, difficulties frequently occur owing to the high friction. Similar difficulties may arise in the processes of weaving, texturizing, knitting, cutting, surface coating with a magnetic layer and assembling into electric parts. Low opacity, which is often undesirable for wear as well as for film recognition, may also be a problem.

Attempts have been made to remedy these difficulties by incorporating fine particles into the polyesters, thus improving polymer flow at various processes, reducing luster and giving unevenness on the surface. Two different methods are known to the art among such attempts:

1. Addition of finely-divided inert materials to polyesters. Examples of such materials are titanium dioxide, talc and kaolinite. The particles added by this method are hereinafter referred to as "inert particles".

2. Formation of particles in the process of polyester synthesis. These particles are derived from the residue of metal catalysts which are added to accelerate the reaction. Typically, compounds of alkaline earth metals are employed for this purpose. The particles formed by this method are hereinafter referred to as "reactive particles", for the chemical composition changes during the reaction.

Neither of these are, however, completely successful. When the "inert particles" method is employed, it is often difficult to produce sufficiently fine materials. Even fine materials may coagulate with each other to give coarse particles. The poor affinity of these mineral materials for the polyester matrix is another reason for the unsuccessful results in the use of the method.

However, addition of many "inert particles" to the molten polymer, in an amount sufficient to reduce friction and luster, leads to an excessive reduction in yarn and film strength. Products from such polymers have many drawbacks known as fish eyes or drop-outs (vacant magnetic memory). The argillacious materials are often impure, which means possible reaction hindrance or poor polymer color. Deflocculants may also reduce heat stability and electric insulation of the polyesters. On the other hand, the previously referred to prior art polyester polymer compositions including "reactive particles" contain only small quantities of "reactive particles", usually less than 0.2% by weight and these are mingled with coarse "reactive particles" in the polymer.

Furthermore, using the previous polyester polymer compositions above-mentioned, not only has it been found that a sufficient level of slippery tendency of surface and of haze cannot be obtained, but also various undesirable results such as fish eyes or drop-outs are induced, and breakage problems often develop in the fiber and film-forming process.

Any increase in the amount of the metallic compound catalyst, which is intended to increase the amount of "reactive particles", brings about an increase in the amount of coarse "reactive particles" (resulting from aggregation of particles), coloring of polyester polymer compounds by the acceleration of the sub-reaction rate, lowering of the softening points of the polymer and an increase of carboxylic terminal function of the polymer.

It is known that phosphorus-containing compounds may be added at the same time to prevent production of the coarse "reactive particles", but, in this case, it has been proven to be unsatisfactory due to the resultant decrease in the amount of "reactive particles", despite the acceptable size of the "reactive particles" thus obtained.

An object of the present invention is to improve the deficiencies of the previous polyester polymer compositions including "reactive particles" in which the amount of "reactive particles" is insufficient, and the size of these particles is not uniform.

It is a further object of this invention to provide a polyester polymer composition with improved qualities over the film and fiber formed from the previous polyester polymer compositions in the prior art, especially those which are unsatisfactory in the slippery, hazy and flat properties of the surface of the film, and in ease of film-forming therewith.

It is another object of this invention to provide a polymer composition which is superior in fiber formation, and has a unique brightness and touch as a filament.

Another object is to provide an improved polyester composition in which the physical and chemical properties of the film or fiber do not deteriorate, despite the fact that they contain the "reactive particles" in the present invention, which are excellent in size, large in quantity and uniform in distribution.

Another object is to depress the unfavorable tendency of the polyester composition containing reactive particles which is proceeding toward crystallization even while in the undrawn stage, making the subsequent drawing operation difficult.

The above objects of this invention are achieved by forming and providing a polyester composition containing from about 0.2 to 3% by weight of "reactive particles" consisting of lithium and phosphorus as a lithium salt of phosphoric acid ester constituent of short chain polyesters.

Polyester compositions according to this invention are fiber- and film-forming polyesters, for example, polyethyleneterephthalate, poly-4-cyclohexelene dimethylene terephthalate, polyethylene 2.6-naphthalene dicarboxylate. Of course, polyesters mentioned herein can be homopolyesters and/or copolyesters. The copolymerizing components in this invention can be, for example, adipic acid, sebacic acid, phthalic acid, isophthalic acid, 2.6-naphthalene-dicarboxylic acid, 5-sodium sulfoisophthalic acid, trimellitic acid, pyromellitic acid as di or polycarboxylic acid component, p- oxyethoxy benzoic acid a oxy-carboxylic acid, and diethylene glycol, propylene glycol, neopentylene glycol, polyethylene glycol, p-xylene glycol, 1,4-cyclohexyl dimethanol, 5-sodium sulforesorcin as glycol component.

The copolymerization ratio is preferably under 20 mole % in order to obtain good processability in fiber and film formation.

Other polymers can be mixed with said polyesters up to 20%; for example, other saturated linear polyesters, undesaturated polyesters, polyamides, polystyrenes, polypropylenes, and polyethylenes.

Moreover, it is possible to combine reinforcing agents such as glass fibers and metal fibers in the polyester composition.

In the present invention, lithium and phosphorus containing "reactive particles" are included in the polyester composition; these lithium and phosphorus containing organic materials are separated from the polyester composition by the following method.

Separation of the "reactive particles"

300 gr. of polymer composition are added to 2.7 kg. of O-chlorophenol and dissolved by raising the temperature to 100° C, while stirring, for 1 hr.

However, in using the above method, highly crystallized parts of the polymer are often not completely dissolved; in such a case the polymer should be melted and then successively quenched prior to being dissolved.

The solution obtained is cooled to room temperature. Then, to exclude the dust or other contamination contained in the polymer, the "reactive particles", the solution is filtered by a G-3 glass filter.

The excluded weight is reduced from the sample weight.

Rotor RP-30 is set in ultra-centrifuge 40P (made by Hitachi Seisakusho Co. Ltd.). 30 ml. of the above solution is poured into a cell. Then the rotor is rotated at 4500 rpm. After smooth rotation has been achieved, the equipment is evacuated and the speed of rotation is increased to 30,000 rpm.

The "reactive particles" are separated centrifugally at this rotation speed at room temperature.

After about 40 minutes, separation is completed.

If necessary, the completion of separation can be confirmed in the following manner.

Namely, light transmission ratio of 375mµ of the liquid after separation is measured and if this value reaches a constant value higher than that before separation, the completion of the separation is confirmed.

After the separation, the supernatant liquid is removed by decantation. In order to remove the remaining polymer component in the separated particles, o-chlorophenol, at room temperature, is added to the separated particles and mixed to form the homogeneous emulsion; ultracentrifugation is then repeated.

This operation is repeated until the melting point of the polymer cannot be detected when the separated particles after drying are analyzed with a differential scanning calorimeter.

The separated particles thus obtained are weighed after vacuum drying at 120° C. for 16 hrs. The aforementioned lithium and phosphorus containing "reactive particles" consist generally of a lithium salt of a phosphoric acid constituent of a short chain polyester, formed by the reaction of the polyester-forming components with lithium and phosphorus in the course of the polymerization reaction.

In the present invention the content of the "reactive particles" should be in the range of 0.2–3.0 wt % of the polyester component. If the content of the "reactive particles" is less than 0.2 wt %, the filaments or films made of this polymer are not sufficiently slippery for processing and the resultant products such as fibers and films have poor opacity, so the processability in the after-treatment is unimproved.

On the other hand, a content of more than 3.0 wt % cannot be recommended because the "reactive particles" while they are necessary in the present invention, have the tendency, in excessive amounts of coarsening and cannot develop sufficient qualities in the course of the melt spinning or film forming, and the resultant filaments or films have coarse particles and many defects.

The content of the lithium in the "reactive particles" of the present invention should be preferably in the range of 1.0–4.0 wt %. A lithium content of less than 1.0 wt % can only develop insufficiently fine and less uniform particles.

On the other hand, a lithium content of more than 4.0 wt % induces an undesirable deterioration of particles.

"Reactive particles", which contain other metal components such as alkaline earth metals in place of the lithium element, have a broad distribution of the particle size with a high average value, and contain many coarse particles.

This tendency increases conspicuously with the amount of particles.

But the "reactive particles" of the present invention (containing lithium and phosphorus) are surprisingly fine and uniform, and these excellent properties are maintained in a large proportion of the particles. The coexistence of another metal such as an alkaline-earth metal does not depress the excellent characteristics of the active particles containing lithium and phosphorus.

Therefore metals other than lithium may be incorporated safely in the "reactive particles" with the lithium and phosphorus in the polyester components of the present invention.

As mentioned above, this polyester containing lithium and phorphorus in the form of "reactive particles" has so many uniformly dispersed fine particles of less than 1µ, that friction is reduced in fiber producing of film forming processes, and the products have improved opacity, slipperiness, and no coarse particles which might cause defects, thus giving the products excellent quality.

When thick films or thick yarns are produced, crystallization proceeds even in the undrawn step making the successive drawing process difficult. This may be caused by the action of the "reactive particles" of lithium as nuclei of crystallization.

To depress this unfavorable tendency of the polyester composition containing "reactive particles" including lithium to crystallize, it is necessary to incorporate phosphorus into the "reactive particles" along with the lithium.

That is, when phosphorus exists in the "reactive particles" together with lithium, they no longer show any such crystallization behavior as observed for the "reactive particles" of lithium which do not contain phorphorus. Thus, it not only becomes easier to produce thick films and thick yarns, but also the "reactive particles" become surprisingly fine to minimize the disadvantages caused by coarse particles.

The formula of the "reactive particles" containing lithium and phosphorus, in the case of polyethylene terephthalate, is as follows:

$(LiO)_1PO\hspace{-0.05em}-\hspace{-0.2em}O\hspace{-0.2em}-\hspace{-0.2em}(R_2)_m\hspace{-0.2em}-\hspace{-0.2em}OOC\hspace{-0.2em}-\hspace{-0.2em}R_1\hspace{-0.2em}-\hspace{-0.2em}COO\hspace{-0.2em}-\hspace{-0.2em}_{\overline{n}}(R_2)_n\hspace{-0.2em}-\hspace{-0.2em}OH]_q$ wherein $n$ is an integer from 1 to 5; 1 and $q$ are integers, the sum of which is 3, $R_1$ is

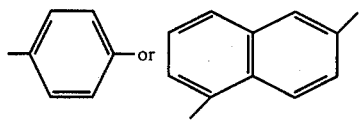

and $R_2$ is $-(CH_2)_m-$, where $m$ is 2-10 (particularly $-CH_2CH_2-$, $-CH_2CH_2CH_2-$) or

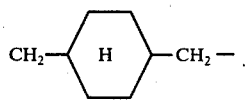

This is a lithium salt of a phosphoric acid ester constituent of a short chain synthetic linear polyester, based on terephthalic acid or 2,6 naphthalene dicarboxylic acid and polyalkylene glycol or cyclohexane dimethanol as the polyester-forming reactants. In order to retard the crystallization rate of the polyester compositions according to the invention, the "reactive particles" contain phosphorus in an amount exceeding 2.0% by weight; if the phosphorus content of the reactive particles is less than 2.0% by weight, such an excellent retardation effect cannot be obtained. However, if the content exceeds more than 9% by weight, the "reactive particles" disappear and it becomes difficult to obtain the necessary quantity of such particles. The above mentioned crystallization rate can be evaluated by the peak temperature and half value width of the exothermic peak of the thermograms which are obtained by cooling the molten sample at a constant rate in a differential scanning calorimeter. The description refers to the attached FIG. 3 which schematically shows the crystallization behavior of polyethylene terephthalate with various kinds of particles.

In FIG. 3, the curves 1, 2, and 3 represent exothermic peaks of polyethylene terephthalate with no "reactive particles" 1, with the "particles" having lithium and phosphorus 2, and with the "particles" having only lithium 3, respectively, and furthermore temperature 4, and line 5 indicate the exothermic peak temperature and the half value width of each peak, respectively, as is shown in the following table.

|  | peak temp. | half value width |
|---|---|---|
| PET in the absence of the particles | 200° C | 12° C |
| PET in the particles containing Li and P | 202° C | 12° C |
| PET within the particles containing only Li | 206° C | 10° C |

In this case, high peak temperature and a narrow half value width suggest a high crystallization rate. The results obtained substantiate the excellent retardation effect of polyethylene terephthalate with "the particles" containing lithium and phosphorus.

According to the present invention, polyester compositions can be obtained by adding lithium containing compounds and phosphorus containing compounds to the polyester prior to its polymerization and completing the polycondensation.

The polyesters mentioned above consist of aromatic dicarboxylic acids or their ester derivatives and ethylene glycol or other glycols and carboxylic acids other than those mentioned above.

In the present invention, the kinds and amounts of lithium and phosphorus containing compounds which are added to the polyester should be selected carefully. Such compounds as lithium halide, for example lithium chloride, lithium iodide, lithium acetate, lithium carbonate, lithium hydride, lithium hydroxide, lithium benzoate, and lithium formate are preferably used because of their good solubilities with the reactants. As the phosphorus containing compounds, phosphoric acid and its esters or phosphorous acid and its esters are preferably used. The amount of lithium containing compounds added to the polyester is preferably 0.01–0.1% by weight of lithium.

The amount of phosphorus containing compounds added to the polyester is preferably 0.01–0.05% by weight of phosphorus.

Ethylene glycol solution or slurry of lithium and phosphorus compounds are preferably used as these are added to the polyester.

These lithium and phosphorus compounds can be added any time before the polymerization is complete, preferably before the intrinsic viscosity of the polyester reaches to 0.3.

In the present invention, the polyester compositions containing the "reactive particles", as above mentioned, have uniform and fine "reactive particles" which amount to 0.2-3% by weight of the polyester.

In the present invention, these polyester compositions have excellent frictional characteristics, opacity and adequate rate of crystallization compared with the polyester compositions previously obtained. Excellent properties are exhibited when these polyester compositions are subjected to the fiber forming, film forming and molding processes as described below.

The following results are to be expected when the polyester compositions of this invention are manufactured into fiber products through melt-spinning, hot-drawing and heat-treatment processes.

1. Improved processability resulting from the increase in deformability of the polymer in spinning and drawing processes and of running speed of the fiber on the guide.

2. Decreased breaking of threads during spinning and drawing (the effect is especially remarkable for a thread with modified cross section).

3. Increased uniformity of deformation of the polymer in spinning and drawing gives rise to an improvement in uniformity of qualities.

4. Improved processability in the processes of texturizing, twisting, weaving and knitting.

5. Improved adhesiveness in the usage for rubber reinforcement.

Furthermore, the following excellent effects are also to be expected when the polyester compositions of this invention are melt-extruded into film and stretched biaxially, restretched in the longitudinal direction, heat-treated, slitted and wound up.

1. Increase in the speed of film-production resulting from the improved deformability of the polymer.

2. Uniformity of quality of the film is improved by increase in deformability of the polymer. 3. Decrease of stretch tension in the transverse direction of the film reduced the mechanical load of the tenter.

4. Reduction of the friction between the film and blade of the slitter reduces the deformation of edges of the slitted film.

5. The film can be wound up more uniformly giving the rise to a hard wound roll.

6. Outstanding quality with an excellent opacity and slippery surface free from undesirable coarse particles and faults.

The above described effects have been hitherto insufficiently or rarely obtained with commercially available compositions and are now successfully obtained by this invention for the first time.

The polyester compositions of this invention, exhibiting the above mentioned excellent characteristics in the processes of fiber-forming and film production, are quite useful not only for uses such as filament, staple, biaxially oriented film, and film bases for magnetic and video tape, but also for unoriented or uniaxially oriented film and even for plastics.

Furthermore, biaxially oriented matted polyester film can be produced from the said polyester composition.

This polyester film has an excellent matted effect, giving values of 15 to 45% of glossiness of the surface (at 60° C) measured by the method of JIS-Z-8741.

The matted films with such excellent properties can be obtained for the first time by biaxially stretching the polyester compounds with active particles based on this invention. The matted effect is considerably dependent on the stretch ratio, so that a stretch ratio of 1.5-2.8 in one direction is preferable in order to obtain the glossiness of 15 to 45%.

Examples based on this invention follow, and the invention will be described in further detail by way of these examples.

The haze value, in these examples, is measured by ASTM-D 1003-52 and the quantitative analysis of lithium and phosphorus in the "reactive particles" is performed as follows.

Quantitative analysis for Lithium in "Reactive Particles"

This procedure involves adding sulfuric acid to the particle sample, making it a wet ash, heating it for 1 hour at 600° C, and dissolving it in aqueous hydrochloric acid. The lithium is then analyzed quantitatively by atomic absorption spectroscopy, in which $C_2H_2$ gas is used and the absorbance is measured at a wavelength of 6708 A.

Quantitative analysis for Phosphorus

The particle sample is made into wet ash by treatment with sulfuric acid and perchloric acid. Upon adding ammonium molybdate in a solution of sulfuric acid, the color appears. Then the absorbance of this solution is measured at a wavelength of 845m$\mu$, and the phosphorus content is determined using the calibration curve made by the same method.

EXAMPLE 1

100 parts of dimethyl terephthalate and 70 parts of ethylene glycol are transesterfied in the usual manner in the presence of 0.09 parts of manganese acetate as catalyst.

Then 0.03 part of antimony trioxide, 0.20 part of lithium acetate and 0.15 part of trimethyl phosphate are added, then polymerized by the usual manner.

A product having an intrinsic viscosity of 0.63 (here and in the following, the intrinsic viscosity is measured at 25° C in O-chlorphenol) is obtained.

The polymer is pressed between two cover glasses on a hot plate at 290° C to a thin film, and observed in dark ground illumination under a polarization microscope.

Many uniform particles, about 0.5$\mu$ in diameter are observed.

The amount of the "reactive particles", separated by the method as described before, is 0.6 wt % in the polymer.

The separated "reactive particles" are then subjected to elemental quantitative analysis; for carbon, hydrogen in the usual manner and for lithium, phosphorus in the same way as described before. The results are as follows:

| | |
|---|---|
| C | 49.4% (by weight of the separated particles) |
| H | 3.7% (by weight of the separated particles) |
| Li | 1.5% (by weight of the separated particles) |
| P | 4.5% (by weight of the separated particles) |

Further, the infrared spectrum (KBr tablet method, NaCl prism) of the "reactive particles: is shown in FIG. 1-1, and a high resolution NMR spectrum of 100Mc in trifluoro acetic acid (room temperature, sweep time 250 sec. sweep width 1000c, lock signal tetramethylsilan) is shown in FIG. 2.

From elemental analysis, infrared and NMR spectrum, it is clear that the added metal is combined with polyester components to make the "reactive particles".

Then the maximum take-up speed in melt spinning, at an output of 30 g./min. at 290° C, of the polyester composition with the "reactive particles" obtained in this example is 4000 m/min without breaking of threads.

When the undrawn yarn from this polyester composition is drawn 3.5 times at 100° C into 100 pirns of 2 kg weight, no breakage of threads is observed.

The dynamic friction coefficient of this drawn yarn against a roll plated with chromium is 0.62.

On the other hand, the polyester composition obtained in this example is processed into biaxially oriented film of 25$\mu$ thickness and 3000 m length under the usual film forming condition and is wound up (machine direction stretch ratio, 3.3; transverse direction stretch ratio, 3.4; heat set temperature, 215° C; heat set time 13 sec.) and then this rolled film is cut into 2 cm. width by a knife edge.

The static friction coefficient between the above films is 0.40, the haze of the film is 32%, the maximum surface roughness by the stylus method is 0.2$\mu$, and the surface of this film, as shown in FIG. 4-1, has many fine points of uneveness.

Wound forms of both unslitted and slitted film are very excellent; it is especially noted that there is no deformation of edges on the slitted end of the wound film.

Comparative Example 1

By the same method as used in example 1 except adding only antimony trioxide and lithium acetate after transesterification, a polyester is prepared and the particles are separated from the polymer and analyzed, and spinning tests and film forming tests are carried out.

The particle content is 1.5 wt. %. Elemental analysis of the separated particles shows that carbon, hydrogen and lithium content are 58.9, 3.7 and 2.8%, respectively. The infrared spectrum of the above particles is shown in FIG. 1-2.

The maximum take-up speed of this polymer is 3800 m/min., and breakage of threads is observed on two pirns, the dynamic friction coefficient of the yarn against the roll plated with chromium is 0.60, the static friction coefficient between $25\mu$ films is 0.38, the haze is 54%, and the maximum surface roughness is $0.3\mu$.

The analytical data of the said polyester composition with the differential scanning calorimeter, shown in FIG. 3—3, indicates that the rate of crystallization is higher than that of the polymer obtained in example 1 (FIG. 3–2).

Comparative Example 2

Polymerization is carried out by the same method as example 1, except that 0.09 part of calcium acetate is added as a transesterification catalyst and both lithium compounds and phosphorus compounds are not added.

And, in the same manner as in example 1, separation and analysis of the particles, spinning and drawing tests, and film forming test are performed.

Coarse particles of about $5\mu$ are found in the polymer by microscopic observation. The particle content 0.2 wt. %.

The maximum take-up speed of this polymer is 2700 m/min. Breakage of threads is observed on 8 pirns and a white particle is observed at the end of the broken thread.

The dynamic friction coefficient of the yarn against the roll plated with chromium is high, i.e., 0.98.

The static friction coefficient between films is 0.72. The haze is 6%, and maximum surface roughness is $0.6\mu$.

A photograph of its surface is shown in FIG. 4–2.

The wound form of this film is loose and deformation of edges on the slitted end is observed.

Comparative Example 3

Polymer is produced by the same method as Comparative Example 2, except that 0.05 part of lithium acetate is added as a transesterification catalyst.

The particle content is 0.1 wt. %. The static friction coefficient between films is 0.75, and the haze is 7.5%. Slipperiness and opacity are not sufficient.

EXAMPLE 3

Ester-interchange reaction is carried out, using 100 parts of dimethyl -2, 6-naphthalene dicarboxylate, 50 parts of ethylene glycol and 0.1 part of calcium acetate as catalyst.

Then adding 0.03 part of antimony trioxide, 0.5 part of lithium iodide, and 0.3 part of triphenyl phosphite to the product of above reaction, the polymerization reaction is completed by the usual method.

Many fine particles of $0.6\mu$ are found by microscopic observation, and no coarse particles of over $1\mu$ are observed.

EXAMPLE 4

By the same method as Example 1, an ester-interchange reaction is performed; then adding 0.03 part of antimony trioxide, 0.11 part of lithium carbonate and 0.05 part of phosphorus acid, polymer-products of intrinsic viscosity 0.65 are obtained by a polymerization reaction of the usual method.

The particle content is 0.8 wt. %, and lithium and phosphorus contents in the particles are 1.8 wt. % and 4.0 wt. %, respectively. By microscopic observation, the maximum particle size is $1.0\mu$, and there are many fine particles having a size of about $0.5\mu$.

EXAMPLE 5

In Example 4, adding 0.02 part of lithium hydride 0.05 part of phosphoric acid in place of lithium carbonate and phosphorous acid, a polymerization reaction is performed by the normal method.

Microscopic observation shows many fine particles having a size of about $0.5\mu$.

EXAMPLE 6

In Example 5, adding 0.18 part of lithium formate in place of lithium carbonate, a polymerization reaction is performed by the normal method. Microscopic observation shows many fine particles having a size of about $0.5\mu$.

EXAMPLE 7

Esterification reaction is carried out by the usual method, using 100 parts of terephthalic acid, 145 parts of cyclohexane-dimethanol and 0.015 part of NaHTi(OC$_4$H$_9$)$_6$ as esterification and polymerization catalyst.

After esterification is complete, 0.3 part of lithium benzoate, 0.15 part of trimethyl phosphate are added and polymerization is performed by the usual method, a polymer product of intrinsic viscosity is obtained.

The particle content is 0.5 wt. %, and lithium and phosphorus contents are 2.0 wt % and 5.2 wt. % respectively; and microscopic observation shows many fine particles of about $0.5\mu$, and no coarse particles of over $1.0\mu$.

EXAMPLE 8

An esterification reaction is carried out by the usual method, using 100 parts of terephthalic acid, 95 parts of 1,4-butanediol and 0.1 part of lithium hydride with 0.05 part of Na HTi(OC$_4$H$_9$)$_6$ as the catalyst for both esterification and polymerization.

After esterification, 0.18 part of trimethyl phosphate is added and the polymerization is completed by the usual method. Microscopic observation shows many fine particles of $0.6\mu$ and no coarse particles of over $1.0\mu$.

EXAMPLE 9

Transesterification is carried out by the usual method, using 100 parts of dimethyl terephthalate and 96 parts of ethylene glycol with 0.065 part of zinc chloride as the transesterification catalyst.

Then adding 0.027 part of antimony trioxide as the polymerization catalyst and 0.8 part of lithium acetate and 0.02 part of phosphoric acid, polymerization is completed by the usual method; the intrinsic viscosity of this polymer is 0.641. The above prepared polymer is dried under 3 mmHg at 180° C, for 24 hours. The dried polyester is melt extruded by an extruder having a diameter of 90 mm. and then filtered through a porous metal filter which can at least separate off 98% of $70\mu$ particles. The polymer is then formed into a sheet having 650 mm. width.

After the extrusion, the sheet is quenched over a casting drum, 700 mm in diameter, rotating at a surface speed of 220 m/min. This sheet is then biaxially stretched at 90° C, at a stretch ratio of 2.1 in the machine direction and 2.8 in the transverse direction, followed with a thermal treatment at 210° C for 13 seconds. A finished film, 25μ in thickness, is obtained. The glossiness of the surface (at 60°) of the above prepared film, by the method of JIS Z 8741, is 32%; it presents a dull luster and is sufficient for matted film. Moreover the pressure increase in the filtering process is observed to be little and the processability of the polymer in the film is good. The particles content in the above prepared film is 1.5%.

EXAMPLE 10

Polymerization is carried out by the same method as Example 9 except that 0.3 part of lithium chloride is used instead of lithium acetate. The intrinsic viscosity of this polymer is 0.622. This polymer is formed into matted film by the same method as in Example 9. The glossiness of the surface (at 60°) of this film is 34%. This film presents a dull luster and is satisfactory for matted film. Moreover the pressure increase in the filtering process is small and the processability in film form is good. The particle content in this film is 1.3%.

We claim:

1. A polyester fiber or film comprising a synthetic linear polyester selected from the group consisting of polyethylene terephthalate, poly-4-cyclohexylene dimethylene terephthalate and polyethylene 2,6-naphthalene dicarboxylate, together with a multiplicity of particles distributed therein in an amount of about 0.2-3.0% by weight, of the total of said polyester and said particles, said particles being composed of lithium and phosphorus as a lithium salt of a phosphoric or phosphorous acid ester constituent of a short chain polyester having the formula $$(LiO)_lPO[O[(R_2)_m-OOC-R_1-COO]_n(R_2)_n-OH]_q$$

wherein $n$ is an integer from 1 to 5; $l$ and $q$ are integers, the sum of which is 3, $R_1$ is

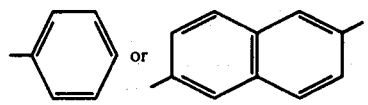

and $R_2$ is —$(CH_2)_m$— wherein $m$ is 2-10 or

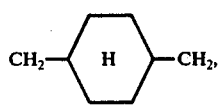

wherein the lithium content is from 1.0-4.0% by weight, based on the weight of said particles, and wherein the phosphorus content of said particles is from 2.0-9.0% by weight, of said particles.

2. A fiber or film as recited in claim 1, wherein said particles are the reaction product of polyester forming reactants and one or more lithium compounds selected from the group consisting of lithium hydride, lithium hydroxide, lithium halide, lithium carbonate, lithium acetate, lithium benzoate, and lithium formate and a phosphorus compound selected from the group consisting of phosphoric acid, phosphoric acid esters, phosphorous acid and phosphorous acid esters.

3. In the method of forming synthetic linear polyesters, adaptable for forming fibers and film wherein an acid component consisting of one or both of the groups consisting of terephthalic acid and 2,6-naphthalene dicarboxylic acid is reacted with a glycol component selected from the group consisting of ethylene glycol, 1,4-butanediol, cyclohexane dimethanol and neopentylene glycol, the improvement which comprises the steps of incorporating into said polyester-forming mixture a lithium compound selected from the group consisting of lithium hydride, lithium hydroxide, lithium halide, lithium carbonate, lithium acetate, lithium benzoate and lithium formate in an amount such that the lithium content of said total composition is from 0.01 to 0.1, by weight, and incorporating into said polyester forming reactant materials a phosphorus compound selected from the group consisting of phosphoric acid and phosphoric acid esters and phosphorus acid and phosphorous acid esters in an amount such that the phosphorus content of said composition is from 0.01 to 0.05% by weight, and reacting both the lithium compound and the phosphorus compound in situ said reactant materials being distributed as particles in said fibers and film in the amount of 0.2-3.0 weight percent of said polyester.

4. The method defined in claim 3, wherein the Li content in the resulting reactive particles is 1.0 - 4.0 wt %.

5. The method according to claim 3, wherein said particles comprise $$(LiO)_lPO[O[(R_2)_m-OOC-R_1-COO]_n(R_2)_n-OH]_q$$

wherein $n$ is an integer from 1 to 5; $l$ and $q$ are integers, the sum of which is 3, $R_1$ is

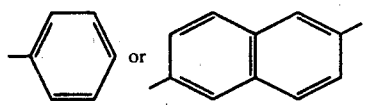

and $R_2$ is —$(CH_2)_m$— wherein $m$ is 2-10 or

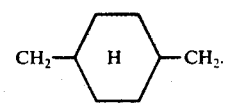

* * * * *